United States Patent [19]

Oliver

[11] Patent Number: 4,538,336
[45] Date of Patent: Sep. 3, 1985

[54] METHOD OF PROVIDING INFINITELY ADJUSTABLE ECCENTRIC MOTION FROM A ROTARY MOTION

[76] Inventor: Michael Oliver, P.O. Box 485, Carson City, Nev. 89701

[21] Appl. No.: 448,300

[22] Filed: Dec. 9, 1982

[51] Int. Cl.³ .............................................. B23P 19/00
[52] U.S. Cl. ..................................... 29/426.6; 29/407; 29/525; 29/526 R; 74/571 M; 74/835; 403/314
[58] Field of Search ....................... 29/526 R, 525, 434, 29/450, 149.5 R, 464, 407, 426.6; 403/409, 374; 74/571 M, 835, 836

[56] References Cited

U.S. PATENT DOCUMENTS

| | | | |
|---|---|---|---|
| 1,648,200 | 11/1927 | Schulze | 403/374 X |
| 1,801,215 | 4/1931 | Wilson | 403/374 |
| 3,257,720 | 6/1966 | Siler | 29/526 X |
| 3,396,596 | 8/1968 | Fischer | 403/374 X |
| 3,574,365 | 4/1971 | Bailey | 403/374 X |
| 3,678,781 | 7/1972 | Rohrburg et al. | 74/571 M |
| 4,311,065 | 1/1982 | De Boo et al. | 74/835 X |
| 4,344,332 | 8/1982 | Schuricht | 74/571 M X |

FOREIGN PATENT DOCUMENTS 1099663  1/1968  Fed. Rep. of Germany ... 74/571 M

Primary Examiner—Charlie T. Moon
Attorney, Agent, or Firm—Herbert C. Schulze

[57] ABSTRACT

This invention is a method and apparatus for quickly and infinitely adjusting the degree of eccentricity of a rotating member wherein a first rotating member is provided with interlocking means to a second member carrying means to rotate at an adjustable off-center relationship to the primary radial center of the initial rotating member. The adjustment is accomplished by an interconnecting tapered fit between the two members utilizing a critical tapered angle which is capable of locking in position by the taper itself but yet which can release when desired for adjustment.

2 Claims, 7 Drawing Figures

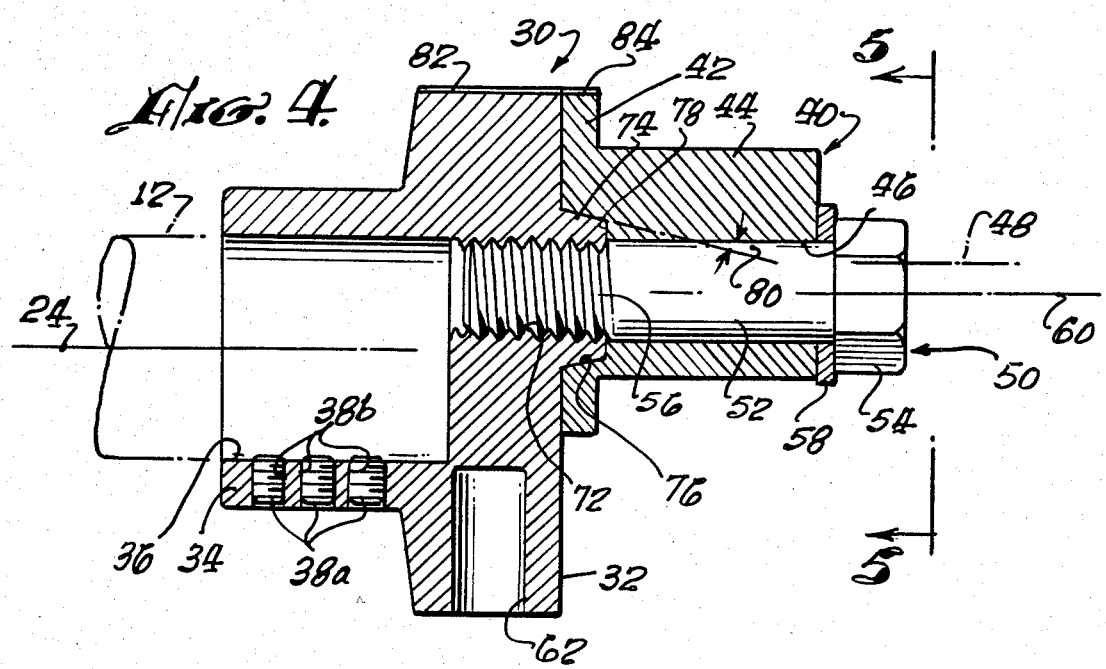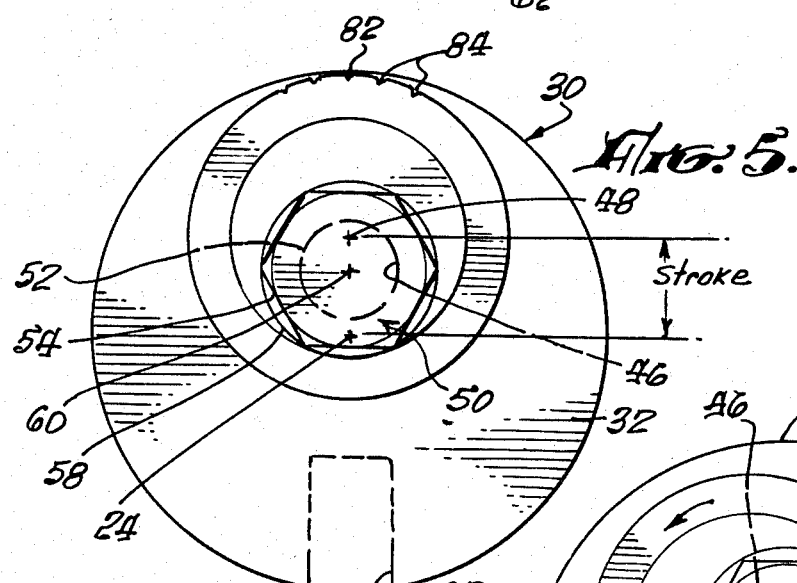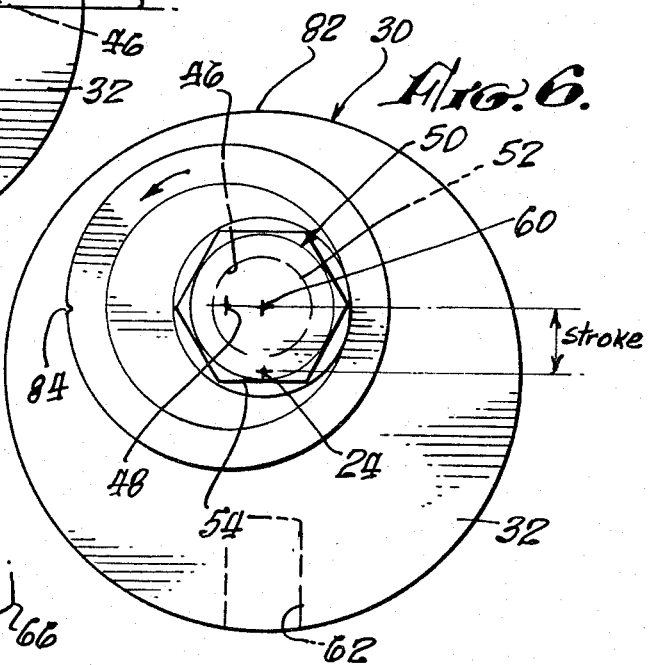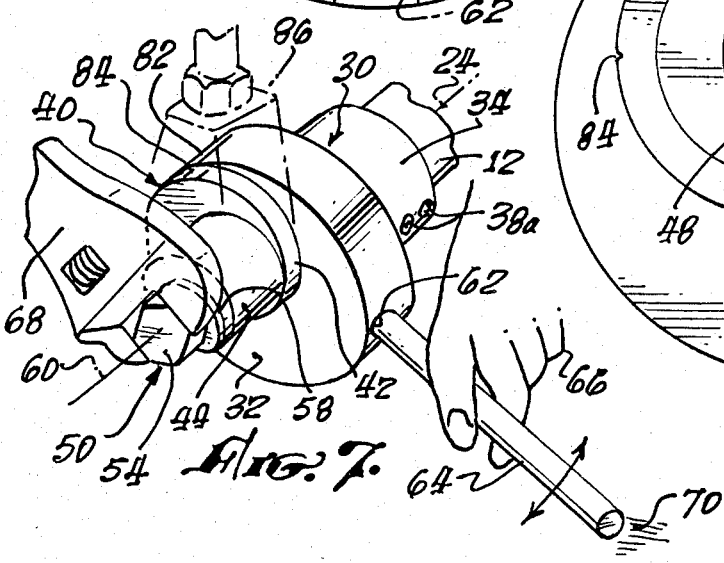

METHOD OF PROVIDING INFINITELY ADJUSTABLE ECCENTRIC MOTION FROM A ROTARY MOTION

CROSS-REFERENCE TO RELATED PATENT APPLICATIONS

There are no patent applications filed by me related to the within invention, except for design application Ser. No. 448,302, now abandoned, for ADJUSTABLE ECCENTRIC SHAFT being filed concurrently herewith.

THE BACKGROUND OF THE INVENTION

1. Field of the Invention

This invention is in the general field of eccentric motions operating in such manner that a member follows an eccentric path with relation to the center of a primary member operating in a rotary path. The invention is more particularly related and directed to such an eccentric motion wherein the amount of eccentricity of the path traced by the eccentric member may be infinitely adjusted from a center position of no eccentricity to an ultimate position of maximum eccentricity and may be locked in such manner as to operate within the eccentric orbit desired. It is further characterized by being quickly adjustable to any position within the maximum and minimum limits of eccentricity defined merely by the size of the elements.

2. Description of the Prior Art

There have been eccentric motions of many types developed from time to time for various purposes. Such eccentric motions universally are arranged so that the eccentric orbiting member may be adjusted in its position of eccentricity but only in fixed increments. Some eccentrics have been developed which can be moved relative to the center in various manners but each of those have been of a complex nature and such that it is frequently impossible to achieve the exact desired position of eccentricity. The present invention incorporates a means for moving in infinite measurement so that no particular finite position is necessary in defining the eccentric orbit.

Further, the means for accomplishing this is by a tapered fit between two members comprising the entire eccentric orbit apparatus which interconnect through a tapered fitting and which are held in the desired orbit position through a critical relationship of the tapered connection which provides for locking by an internally threaded member in such a manner that it may be quickly released and altered. There is no prior art which is known to me which incorporates these features.

SUMMARY OF THE INVENTION

There are many uses for eccentric motions activated by a primary rotary motion such as a rotating shaft or the like. Some of the uses include, uses in mining, particularly, wherein the eccentric motion is connected to an appropriate screen or the like to provide a shaking mechanism to enhance movement of materials through such screen or the like.

Particularly, in the mining business, and in other businesses, it is frequently desired to alter the degree of shaking imparted to a screen of the like. This is useful in order to control the quantity and quality of material being passed through the screen.

There have been for many years, devices suitable to accomplish the change of orbit unless the change in the degree of shaking as desired. Such devices, however, have consisted of plates having a series of holes which can be interconnected or a simple rotating member having various holes into which the eccentric orbiting member may be fastened as desired.

The prior known methods and apparatus for accomplishing this variation in orbiting dimension and stroke has been limited in its use, and less than perfect, since it normally takes a long period of time to change the orbiting stroke, and particularly when different settings are desired to be tested before being fixed into the final position great amounts of time may be lost, and the exact amount frequently cannot be achieved since each change of position is finite change to a predetermined amount rather than being infinitely adjustable.

I have studied this problem and have conceived and developed and over some period of time, refined into a near perfect apparatus and method, the final and ultimate solution.

I have accomplished this by providing a rotating member having a tapered hub with a threaded interior at a position off centered, which hub fits intimately with a tapered boss attached to a member, which is misaligned with reference to the tapered boss. A bolt or the like is placed through the shaft access and when the two tapered members, placed together and drawn together by a bolt or the like they lock into a particular position of eccentricity desired. Yet in order to change in infinitesimal amounts it is only necessary to release the pressure between the two slightly, making desired adjustments and reapply the pressure. This can be accomplished infinitely and repeatedly with an absolute minimum of time and effort.

It is an object of this invention to provide a method and apparatus for creating an eccentric motion to a member relative to a fixed center position of a rotating member. Another object of this invention, is to provide such an eccentric method and apparatus as has been described, wherein the amount of eccentricity can be altered infinitely and quickly.

Another object of this invention, is to provide such an eccentric motion alteration, wherein the two members are locked together through a tapered arrangement, creating a fixed and locking interrelationship between the members but which can easily be released for adjustment.

The foregoing and other objects and advantages will become apparent to those skilled in the art upon reading a description of a preferred embodiment which follows in conjunction with a review of the appended drawings.

BRIEF DESCRIPTION OF THE DRAWINGS

FIG. 4 is an enlarged section, partly in elevation, as viewed along lines 4—4 of FIG. 2;

FIG. 5 is an end elevation viewed in the direction of the arrows 5—5 of FIG. 4;

FIG. 6 is a view similar to FIG. 5, but with the eccentric mechanism in another condition of adjustment; and FIG. 7 is a fragmentary perspective showing the method of loosening or tightening the eccentric mechanism of FIGS. 1 through 6 for adjustment or disassembly.

DESCRIPTION OF A PREFERRED EMBODIMENT

Figure 1:
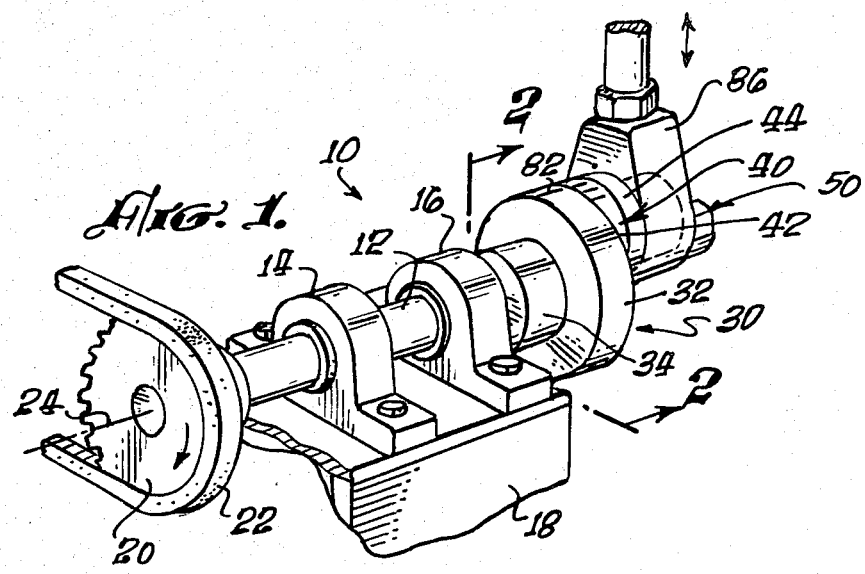
FIG. 1 is a fragmentary perspective of a typical drive assembly utilizing the invention.
Figure 3:
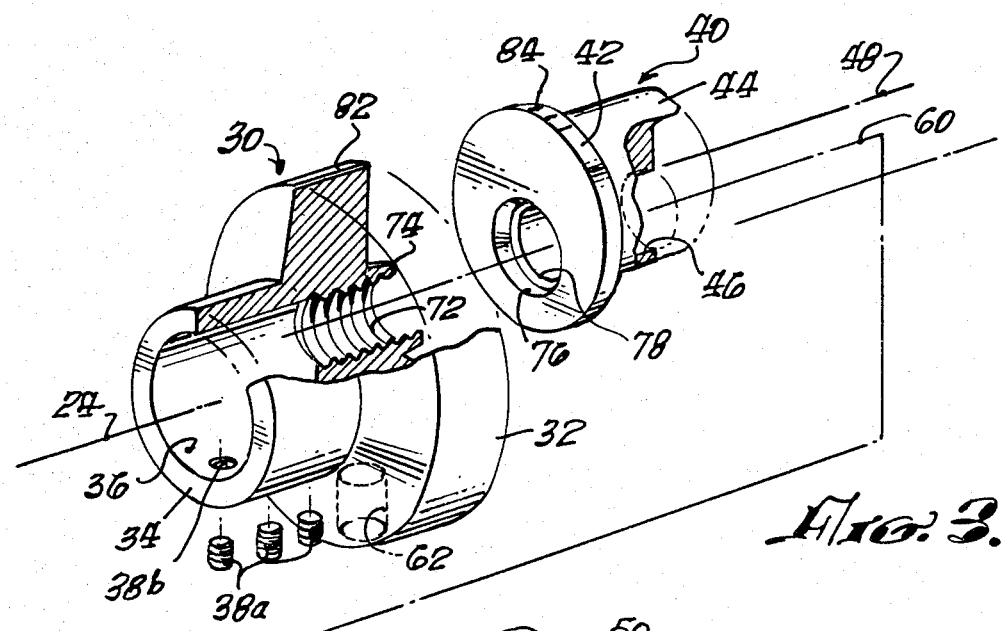
FIG. 3 is an exploded perspective of the infinitely variable eccentric components of the invention.
Figure 2:
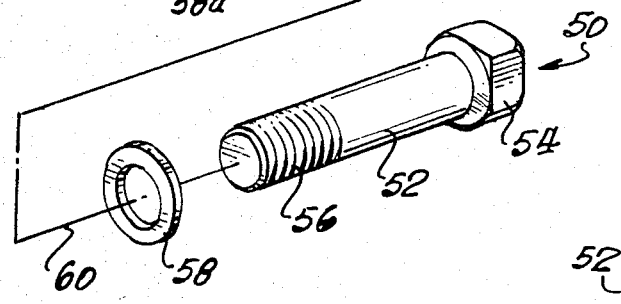
FIG. 2 is an enlarged section as viewed in the direction of arrows 2—2 of FIG. 1.
Figure 2:
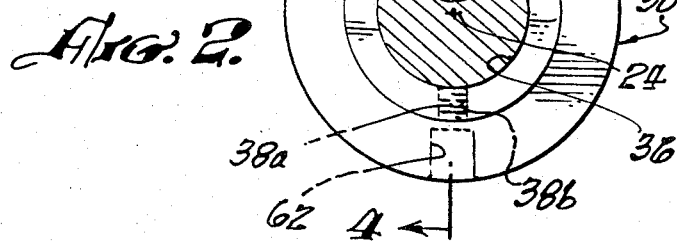

The infinitely variable stroke mechanism is shown in FIG. 1 by the reference numeral 10 and is shown as operably by shaft 12 mounted for rotation in bearing structures 14 and 16.

I have indicated a supporting base 18 and a sprocket 20 driven by chain drive 22 about an axis 24. Such drive mountings are well known to those versed in such art, and it is to be understood that any number of drive assemblies can be substituted to perform the actual required drive input.

A first eccentric member 30 is shown to have an enlarged diameter flange portion 32 integrally connected to a reduced diameter sleeve 34. An opening 36 is formed therein and a series of setscrews 38a, or the like, are shown to be inserted into corresponding threaded holes 38b for the purpose of securing the member 30 to the shaft 12.

The member 30 is cooperatively joined by a second eccentric member 40 of a smaller configuration. This member 40 is shown as being provided with an enlarged flange-like portion 42 and an integrally formed sleeve portion 44. The portions 42 and 44 are concentrically in alignment on an axis 48.

Cylindrical opening 46 is formed through the assembly 40 along a longitudinal axis later to be described.

A bolt 50, having a shank 52, hexagonally formed head 54 and a threaded portion 56, cooperates to secure the members 30 and 40 in fixed relationship to one another in a selected condition of orientation.

Axis 60, concentric with the opening 46, coincides with the longitudinal axis of the bolt 50 and its associated washer 58.

In order to properly tighten, or to, realign the locking together of members 30 and 40 in their preselected positions, a bar or tool handle 64 is shown in FIG. 7 as having been inserted into a provided opening 62 in flange 32 so as to be able to keep members 30 and 40 from rotating together during attempts at loosening the locked relationship between the two. The hand 66 shown in the illustration holds the bar, or handle 64 against the ground, or back-up means, 70 while another hand actuates a wrench 68 to rotate the bolt 50 into a tightening or loosening direction.

The binding, or locking together, of members 30 and 40 is accomplished by tightening the threaded portion of bolt 50 into threaded opening 72 within the member 30. A tapered cylindrical lip 74 projects into a matching taper formed in a recess 76. As the bolt 50 is tightened, the cooperatively matched tapered surfaces of projecting lip 74 and recess 76 are brought together. Shoulder 78 becomes a limiting stop for the outermost portion of lip 74. Thus, when the angle 80 of taper is at or about 10° from the horizontal of longitudinal axis 60, a highly effective locking relationship is achieved between members 30 and 40.

An indicating mark 82 is shown to be provided on the outer surface of flange 32 at a point closest to the axis 60. Similarly, graduated indicia at 84 are shown on the outer circumferential edge of flange 42 of member 40. These latter marks are shown located at the points farthest away from the longitudinal axis 60 on the flange 42.

By loosening the bolt 50, the member 40 can be rotated about axis 60 to a desired amount by means of sighting between mark 82 and any selected mark 84, a rapid adjustment can be made and the bolt retightened to effect a fixed adjustment.

Crank arm 86, which is mounted about bearing sleeve extension 44, can then be actuated in a desired stroke preselected by an operator.

While the embodiment of this invention shown and described is fully capable of achieving the objects and advantages desired, that such embodiments are for the sole purpose of illustration and not for the purpose of limitation.

I claim:

1. The method of providing an adjustable eccentric motion from a rotary motion comprising: affixing a mounting member to rotary output means; locating an off-center threaded opening in said mounting member; providing axially extending tapered tubular connecting portions between said mounting member and a cylindrical member having an off-center opening there through; fastening the cylindrical member to the said mounting member by means of threaded fastening means extending through said opening in said cylindrical member and said connecting portions threaded into the said threaded opening, wherein the said tapered connecting portions locked in position as said fastening means is tightened; providing a bearing means on said cylindrical member; connecting said bearing means to a work output means; activating the rotary output means thus giving an eccentric motion to the cylindrical motion; deactivating the rotary output means; loosening the said threaded fastening means; turning the said cylindrical member to a new position relative to the mounting member; fastening the cylindrical member to said output member by means of the threaded fastening means as before; and reactivating the rotary output means thus giving a different eccentric motion to the cylindrical member than was originally given to it.

2. The method of claim 1, wherein the cylindrical member is once again realigned as outlined in claim 1, but wherein the realignment places the cylindrical member in a position such that it imparts direct rotary motion in complete alignment with the rotary output means.

* * * * *